July 19, 1932.  W. J. OBIDINE  1,867,888

CALCULATING DEVICE

Filed May 14, 1930

Inventor
W. J. Obidine.
by Hazard and Miller
Attorneys

Patented July 19, 1932

1,867,888

UNITED STATES PATENT OFFICE

WLADIMIRE J. OBIDINE, OF LOS ANGELES, CALIFORNIA

CALCULATING DEVICE

Application filed May 14, 1930. Serial No. 452,302.

My invention relates to a mechanically operated calculating device of a type adapted for instructional purposes to be an aid in teaching mathematical calculations of a fairly simple type.

The particular embodiment of my invention as illustrated relates to a calculating device for multiplying to aid the children in learning their multiplication tables, and in this regard a feature of my invention embodies mechanically operated sliding devices, which, when two of these are worked in combination, the product of multiplying two numbers may be obtained.

An object of my invention in a calculating device is the construction of a simple and inexpensive article which is particularly adapted to aid children in learning their multiplication tables and in which the child will become interested in the mechanical operation of the device and by the mechanical operation in connection with different numerals is enabled to learn and memorize the product resulting from the multiplying of two numbers.

Another object and feature of my invention is a calculating device which may be used for instructional purposes, in which a teacher may ask the students the product of multiplying certain numbers, and in demonstrating this may operate the device to indicate the numbers which are multiplied together and then, after receiving the answers, may operate another element of the device to expose the correct answer.

My device can be made substantially entirely from sheet material used together with strips such as heavy paper or cardboard or, if desired, the device may be made of metal to give a greater degree of permanence.

Another object and feature of my invention is forming the calculating device as a relatively thin rectangular structure with vertically and horizontally slidable strips, these strips having adjacent the top and one side of the device a row of numbers which are to be multiplied together. When the strips corresponding to any two numbers are moved outwardly they cause the exposure of a number which is the correct product of the multiplying of the two numbers aforesaid. As the child cannot see the product until after moving the slides, this aids in the memorizing of multiplication tables.

Another object and feature of my device is an arrangement whereby it may be used for instructional purposes in which an instructor may request a student to multiply two numbers together and then the demonstrator may operate the slides to form the multiplication but leave the product covered, and by operating a sliding plate he may then expose the product. It will be obvious that my invention may be utilized for other purposes than simple arithmetical multiplication.

My invention is illustrated as a simple multiplying device in connection with the accompanying drawing in which.

Figure 1:
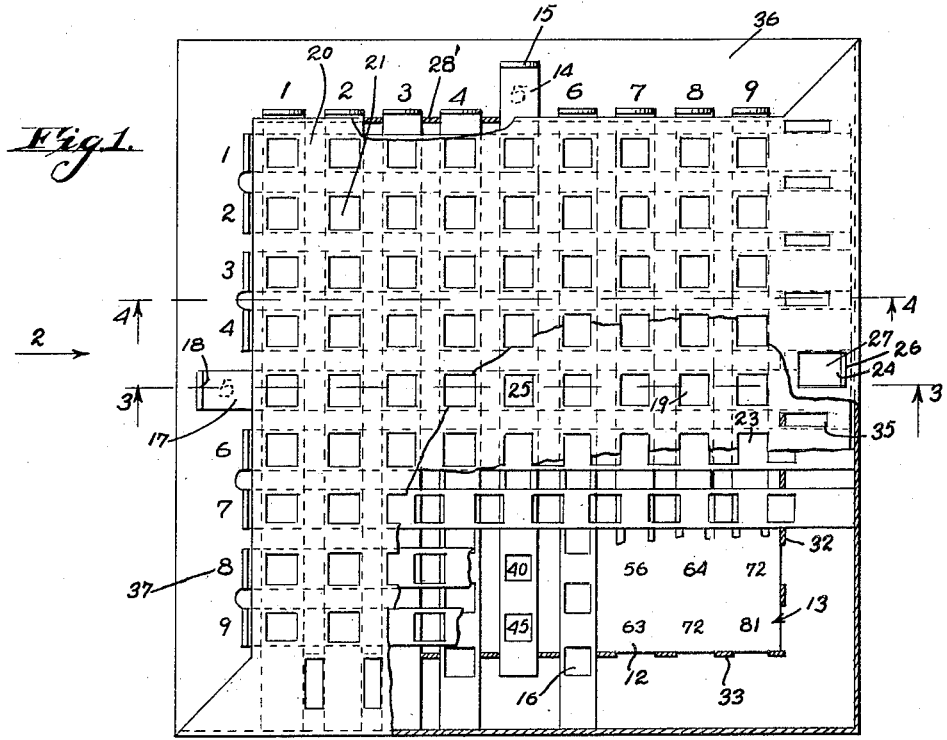
Fig. 1 is a plan with parts broken away to indicate the underneath construction.
Figure 3:
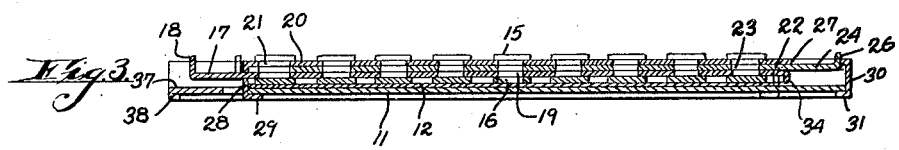
Fig. 3 is a section on the line 3—3 of Fig. 1 in the direction of the arrows.
Figure 2:
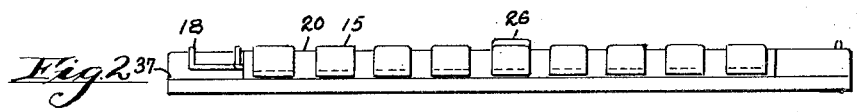
Fig. 2 is a side elevation taken in the direction of the arrow 2 of Fig. 1.
Figure 4:
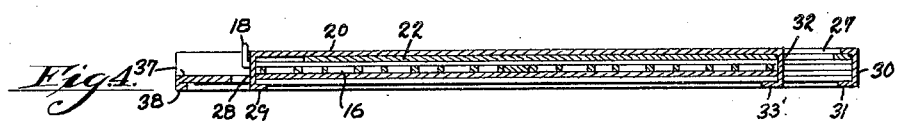
Fig. 4 is a section on the line 4—4 of Fig. 1 in the direction of the arrows.

In constructing my invention I preferably employ a rectangular bottom sheet 11 and in order to make a permanent construction the device is usually made of sheet metal or sheet metal strips except for the card having the numbers. Above this bottom sheet there is a card 12. This card has a series of numbers 13 thereon, these being the product of the numbers later indicated which are to be multiplied together. The numbers 13 are arranged in what may be designated as horizontal and vertical rows. Located above the card there are a series of vertical slide strips 14, each having an up-turned end 15 and such strips are provided with perforations 16, the strips are spaced apart and guided as hereinunder detailed. The next upward layer consists of horizontal slide strips 17 having an up-turned end 18. These up-turned ends 15 and 18 are to be engaged by the fingers or thumb nail to aid movement of the slide strips. This strip 17 also has perforations 19. A top plate 20 is positioned above the slide strips and has a series of perforations 21. These perforations are all illustrated as being square in order to expose the numerals 13.

If it is desired to have an obscuring or blanketing plate, this plate indicated at 22 is preferably located directly below the plate 20 and such plate has a series of perforations 23. The blanketing plate is preferably rectangular and has a pulling strip 24 at one side which has an up-turned end 26 which slides in a slot 27 in the top plate 21.

The manner of securing the plates together and forming guides is by having down-turned fingers 28 from the side margin of the upper plate 20, and 28' adjacent the top margin, which fingers extend through a perforation in the bottom plate 11 and have a turned end 29 passing underneath the bottom plate 11. This arrangement is made at the left side and at the top of the construction. At the right and bottom margin the top plate may have a vertical edge strip 30 with an under-bent bead 31 as an aid to securing the top and bottom plates together. There are a plurality of fingers 32 and 33 which extend downwardly from the top plate between the rows of sliding strips and extend through a perforation in the bottom plate having an under-bent end 33'.

These fingers 28, 28' form guides for the sliding strips 17 and 14 respectively and space these strips the proper distance apart. The fingers 32 and 33 adjacent the right hand side and the bottom of the strips space the slide strips at their ends and form a guide at their sliding movement. All of these fingers additionally function to hold the top and bottom plate together with the slide strips and, if used, the obscuring or blanketing plate in position. Each of the strips is formed with a slight bead 34 at its ends which forms a limit to its movement when drawn outwardly. For instance, the bead on the bottom strips 17 will engage with the right hand vertical strip 14 and limit the outward movement of the strip 17. Their inward movement is limited by the margin 30 of the device. Similarly, the strips 14 are provided with a bead which limits the sliding movement of such strips.

In order that the blanketing or obscuring plate may be shifted it is necessary to provide this plate with a series of slots 35, there being one for each of the fingers 32. This slot and finger connection also effectively guides the obscuring plate.

On the margin 36 of the bottom plate 11 at the top and on the sides there are a series of numerals 37, these being indicated as from 1 to 9, and these are the numbers which are to be multiplied together.

The manner of operation and functioning of the device above described is as follows:

In the illustration, presuming it is desired to multiply 5 by 5, the vertical strip corresponding to the numeral 5 and the horizontal strip also corresponding to the designated number are drawn outwardly and this causes the perforations in each slide strip to register and to register with the numeral 25 on the card. When the obscuring plate is used this may then be drawn to the right, causing the perforations in such plate to register with the perforations of the strips and with the perforations in the top plate and thus expose the numeral 25, thereby indicating the correct product.

In the illustration for simplicity's sake the multiplying table may be taken from 1×1 to 9×9.

It is obvious that any vertical strip and any horizontal strip may be drawn outwardly at the same time and thus indicate the multiplying of the two numbers represented by the strips, and the correct product is given and indicated through the exposure apertures or perforations.

In the construction indicated, in order to bind the edges of the under plate, these have an under-turned bead 38 at the left and top margin.

Figure 5:
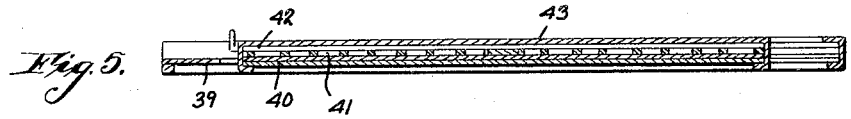
Fig. 5 is a section of multiplication in which the obscuring or blanketing plate is omitted.

The construction of Fig. 5 is somewhat simplified by omitting the obscuring or blanketing plate. In this case there is the under rectangular sheet 39 on which is mounted the card 40 having the numerals indicating the product. There are vertical slide strips 41 and horizontal slide strips 42 with a cover plate 43. The strips have perforations as has the cover plate similar to those of the constructions of 1 through 4, and these plates may be held together in the same manner and have fingers forming guides for the slide strips. Therefore, when the slide strips are operated the numbers are directly exposed.

As generally constructed, the calculating device for use by school children would have the numbers from 1 to 12 in order to obtain the product of such numbers. It is obvious, however, that the card having the numbers thereon may be changed and different numerals arranged at the margins of the device, thus showing the multiplication of other sets of numbers.

It is obvious that various indicia may be placed on the card and exposed through the apertures for purposes other than multiplying calculations. For instance, mileage distances could be placed on the card, and opposite the slides there could be a list of different towns or places, and by moving any two slides outwardly this would expose the distances between these two places. Other adaptions of my invention, it is believed, will be obvious.

Various changes may be made in the details of construction without departing from the spirit or scope of the invention as defined by the appended claims.

I claim:

1. A calculating device having a flat sheet with a first series of numerals thereon, a structure having a horizontal and a vertical row of numerals, the numerals of the first series being the product of any two of the horizontal and vertical series, a horizontal series of slide strips, and a vertical series of slide strips, said strips overlapping and each having a plurality of perforations, there being a strip associated with each number of the horizontal and vertical series, means to slide said strips to register the openings and expose the numerals of the first series, an obscuring plate above said strips with a series of perforations therein, and means to move said plate to obscure the numerals or to expose the numerals through the perforations.

2. A calculating device having a flat base having a vertical and a horizontal row of numerals adjacent a vertical and horizontal margin, a third set of numerals arranged in the form of a rectangle, a horizontal series of strips each having a plurality of openings, a vertical series of strips each having a plurality of openings, said strips overlapping, there being a strip for each of the marginal numerals, there being guide means for the strips and means to limit the motion of said strips, the strips when in an innermost position forming an opaque covering for the numerals of the third set, and said strips when pulled outwardly bringing the perforations of the horizontal and vertical strips in alignment and exposing the numerals of the third series, there being an obscuring plate positioned above the strips and having a perforation for each of the numerals of the third series, and means to move said plate to obscure the numerals exposed by the perforations in the strips or to expose said numerals.

3. A calculating device having a bottom rectangular sheet with a first series of numerals arranged thereon in a rectangular form, a second and a third set of numerals arranged on the margin of the plate, two intersecting series of slidable strips arranged crosswise and extending inwardly from the margins of the plate, each having a plurality of apertures, a top plate positioned above the uppermost sliding strip, fingers interconnecting the top and the bottom plates and forming guides for said sliding strips, said strips being over said numerals whereby when the strips of the two series are moved outwardly the numerals of the first series become exposed through the apertures of the strips.

4. A calculating device as claimed in claim 27, there being an obscuring plate positioned between the top plate and the uppermost series of sliding strips, such plate having a series of slots to accommodate the guide fingers and also having a perforation for each of the numerals of the first set, and means to move the obscuring plate to align the perforations in said plate with the perforations in the strips and, hence, expose one of the numerals of the first set.

In testimony whereof I have signed my name to this specification.

WLADIMIRE J. OBIDINE.